(12) United States Patent
Millar

(10) Patent No.: US 8,904,427 B2
(45) Date of Patent: Dec. 2, 2014

(54) CONTENT SUB-ITEM SUBSTITUTION

(75) Inventor: Keith Millar, Haywards Heath (GB)

(73) Assignee: Cisco Technology Inc., San Jose, CA (US)

( * ) Notice: Subject to any disclaimer, the term of this patent is extended or adjusted under 35 U.S.C. 154(b) by 312 days.

(21) Appl. No.: 13/138,771

(22) PCT Filed: Apr. 1, 2009

(86) PCT No.: PCT/IB2009/051370
§ 371 (c)(1),
(2), (4) Date: Nov. 7, 2011

(87) PCT Pub. No.: WO2010/112978
PCT Pub. Date: Oct. 7, 2010

(65) Prior Publication Data
US 2012/0054791 A1    Mar. 1, 2012

(51) Int. Cl.
*H04N 7/025* (2006.01)
*H04N 7/10* (2006.01)
*H04N 5/76* (2006.01)
*H04N 9/82* (2006.01)
*H04N 5/765* (2006.01)

(52) U.S. Cl.
CPC ............... *H04N 5/76* (2013.01); *H04N 9/8205* (2013.01); *H04N 9/8227* (2013.01); *H04N 5/765* (2013.01)
USPC .............................................. 725/32; 725/36

(58) Field of Classification Search
CPC ... H04N 21/458; H04N 5/76; H04N 21/4147; H04N 21/4532; H04N 21/47214; H04N 21/812; H04N 21/2668; H04N 21/4331
USPC .............................................. 725/32, 34, 35
See application file for complete search history.

(56) References Cited

U.S. PATENT DOCUMENTS 6,698,020 B1   2/2004   Zigmond et al.
7,167,632 B2   1/2007   Cosmao et al.
(Continued)

FOREIGN PATENT DOCUMENTS

WO   WO 01/22729 A1       3/2001
WO   WO 0122729 A1 *      3/2001
WO   WO 2006/003585 A1    1/2006

OTHER PUBLICATIONS

Notification of Transmittal of the International Search Report and Written Opinion of the International Searching Authority for PCT/IB2009/051370.

(Continued)

*Primary Examiner* — Hai V Tran
(74) *Attorney, Agent, or Firm* — Husch Blackwell LLP

(57) ABSTRACT

A method of content sub-item substitution is described. The method includes: receiving from a headend a description of a plurality of virtual channels, the description defining each virtual channel on the basis of one or more metadata attributes associated with that virtual channel; receiving one or more content sub-item substitution opportunities for each virtual channel, each content sub-item substitution opportunity specifying one or more content sub-items for use in the content sub-item substitution; and receiving and recording a content item, the content item including metadata associated with the content item and one or more substitutable content sub-items. The method further includes, upon playback (201) of a previously recorded content item: matching the metadata associated with the previously recorded content item with the one or more metadata attributes, thereby determining a virtual channel (205) valid for the previously recorded content item; selecting a content sub-item substitution opportunity (207) based on the determined virtual channel; and substituting the one or more substitutable content sub-items (211) with content sub-items specified in the selected content sub-item substitution opportunity. Related apparatus and methods are also disclosed.

20 Claims, 3 Drawing Sheets

(56) References Cited

U.S. PATENT DOCUMENTS

| | | |
|---|---|---|
| 7,356,547 B2 | 4/2008 | Ozer et al. |
| 2003/0154128 A1* | 8/2003 | Liga et al. ............. 386/95 |
| 2005/0097599 A1* | 5/2005 | Plotnick et al. ......... 725/32 |
| 2005/0289588 A1 | 12/2005 | Kinnear |
| 2006/0277569 A1* | 12/2006 | Smith ................... 725/35 |
| 2007/0212025 A1* | 9/2007 | Barton et al. ........... 386/94 |
| 2008/0155581 A1* | 6/2008 | Leary .................... 725/13 |
| 2008/0244645 A1 | 10/2008 | Moon et al. |
| 2008/0310820 A1 | 12/2008 | Corry et al. |
| 2009/0086731 A1* | 4/2009 | Lee et al. ............. 370/389 |
| 2009/0165066 A1* | 6/2009 | Brouda ................. 725/110 |
| 2009/0210901 A1* | 8/2009 | Hawkins et al. ........ 725/34 |
| 2011/0162090 A1* | 6/2011 | Fish .................... 726/30 |
| 2012/0124621 A1* | 5/2012 | Wendling ............... 725/34 |

OTHER PUBLICATIONS

Aug. 9, 2012 Office Communication in connection with prosecution of EP 09 786 355.9.

* cited by examiner

CONTENT SUB-ITEM SUBSTITUTION

RELATED APPLICATION INFORMATION

The present application is a 35 USC §371 application of PCT/IB2009/051370, filed on 1 Apr. 2009 and entitled "Content Sub-Item Substitution", which was published on 7 Oct. 2010 in the English language with International Publication Number WO/2010/112978.

FIELD OF THE INVENTION

The present invention relates to a method of and apparatus for content sub-item substitution. In particular, it relates to a method of and apparatus for advertisement substitution.

BACKGROUND OF THE INVENTION

Audio video content is typically broadcast with breaks filled by advertisements. The amount of live television that users are watching is decreasing in favour of recording content on a digital video recorder (DVR) for later viewing. When content is recorded, the advertisements that fill the breaks in the content are also recorded. However these advertisements can be more relevant at the time of the original broadcast than at the time of playback. This is especially true if the recorded content is played back some time after the original transmission of the content.

Advertisement substitution is a technique that uses business rules to target advertisements to individual subscriber homes in a pay TV network. Instead of all viewers receiving the same live channel advertisements, each subscriber is shown targeted advertisements. The targeting is based on a number of factors, often including the original broadcast channel, the genre of the content the substitution opportunity is contained within and the time of day advertisements can be shown.

Operators do not know what content has been recorded by a user and is being stored on disk for later viewing. Therefore, for advertisements in recorded content, advertisement substitution has typically been done using an intelligent agent within the user's DVR, which uses various criteria to determine what advertisement(s) should be substituted within an advertisement substitution opportunity.

SUMMARY OF THE INVENTION

There are problems associated with the use of intelligent agents for advertisement substitution within recorded content. Typically, an advertiser makes a contract with a platform operator to deliver an advertisement a specific number of times. Where the advertisement selection intelligence is placed in a user's DVR, the platform operator is unable to control the number of time an advert is delivered as there is typically no feedback mechanism from the DVR to the headend. Moreover, there are often legal requirements for when certain types of advertisements can be shown and often industry agreed rules for the number of advertisements of the same type that can be shown in a single substitution opportunity. An intelligent agent would have to enforce these rules leading to an increase in the complexity of the advertisement decision system within the DVR.

There is provided in accordance with embodiments of the present invention a method of content sub-item substitution, the method including: receiving from a headend a description of a plurality of virtual channels, the description defining each virtual channel on the basis of one or more metadata attributes associated with that virtual channel; receiving one or more content sub-item substitution opportunities for each virtual channel, each content sub-item substitution opportunity specifying one or more content sub-items for use in the content sub-item substitution; and receiving and recording a content item, the content item including metadata associated with the content item and one or more substitutable content sub-items; wherein the method further includes, upon playback of a previously recorded content item: matching the metadata associated with the previously recorded content item with the one or more metadata attributes, thereby determining a virtual channel valid for the previously recorded content item; selecting a content sub-item substitution opportunity based on the determined virtual channel; and substituting the one or more substitutable content sub-items with content sub-items specified in the selected content sub-item substitution opportunity.

In some embodiments, the content sub-item substitution opportunity includes a validity period according to which the content sub-item substitution opportunity is selected.

In some embodiments, the selecting a content sub-item substitution opportunity includes determining a time for the content sub-item substitution and selecting a content sub-item substitution opportunity if the time falls within the validity period.

In some embodiments, the validity period is defined by a start time and a duration.

In alternative embodiments, the validity period is defined by a start time and an end time.

In some embodiments, the content sub-item substitution opportunities are defined in an order, and a first content sub-item substitution opportunity not yet selected is selected when more than one content sub-item substitution opportunity can be selected.

In some embodiments, the one or more content sub-item substitution opportunities for each virtual channel include a content sub-item substitution schedule, and a new content sub-item substitution schedule is received for each virtual channel at intervals.

In some embodiments, each virtual channel includes a priority, and a virtual channel having a higher priority is used when more than one virtual channel is determined to be valid for the previously recorded content item.

In some embodiments, the metadata attributes include one or more from a group of: content genre, channel, target audience, region, time of day, parental rating, classification and content title.

In some embodiments, the method further includes: marking a content sub-item substitution opportunity as expired after it has been selected, wherein content sub-item substitution opportunities marked as expired cannot be selected.

In some embodiments, at least one of the one or more content sub-item substitution opportunities includes a rule to be evaluated in order to select the content sub-item substitution opportunity.

In some embodiments, the rule comprises a profile attribute, and the selecting includes selecting the content sub-item substitution opportunity if the profile attribute matches a stored user profile attribute.

In some embodiments, at least one of the one or more content sub-item substitution opportunities includes one or more content sub-item spots, each of the one or more content sub-item spots specifying one or more content sub-items for use in the content sub-item substitution.

In some embodiments, at least one content sub-item spot specifies a plurality of content sub-items, and only one content sub-item of the plurality of content sub-items is used in the content sub-item substitution.

In some embodiments, each content sub-item in the plurality of content sub-items is associated with a rule to be evaluated for use in selecting which of the plurality of content sub-items to use in the content sub-item substitution.

In some embodiments, the rule comprises a profile attribute, and the selecting which of the plurality of content sub-items to use includes selecting a content sub-item if the profile attribute matches a stored user profile attribute.

In some embodiments, the content sub-item comprises an advertisement.

There is also provided in accordance with further embodiments of the present invention apparatus for content sub-item substitution, the apparatus including: a receiver, operable to receive from a headend: a description of a plurality of virtual channels, the description defining each virtual channel on the basis of one or more metadata attributes associated with that virtual channel; one or more content sub-item substitution opportunities for each virtual channel, each content sub-item substitution opportunity specifying one or more content sub-items for use in the content sub-item substitution; and a content item, the content item including metadata associated with the content item and one or more substitutable content sub-items; a store, operable to store the description of plurality of virtual channels, the one or more content sub-item substitution opportunities and the content item; a content sub-item processor operable, upon playback of a previously recorded content item, to: match the metadata associated with the previously recorded content item with the one or more metadata attributes, thereby determining a virtual channel valid for the previously recorded content item; select a content sub-item substitution opportunity based on the determined virtual channel; and substitute the one or more substitutable content sub-items with content sub-items specified in the selected content sub-item substitution opportunity.

There is also provided in accordance with further embodiments of the present invention apparatus for content sub-item substitution, the apparatus including: means for receiving from a headend: a description of a plurality of virtual channels, the description defining each virtual channel on the basis of one or more metadata attributes associated with that virtual channel; one or more content sub-item substitution opportunities for each virtual channel, each content sub-item substitution opportunity specifying one or more content sub-items for use in the content sub-item substitution; and a content item, the content item including metadata associated with the content item and one or more substitutable content sub-items; means for storing the description of plurality of virtual channels, the one or more content sub-item substitution opportunities and the content item; means for matching the metadata associated with the previously recorded content item with the one or more metadata attributes, thereby determining a virtual channel valid for the previously recorded content item; means for selecting a content sub-item substitution opportunity based on the determined virtual channel; and means for substituting the one or more substitutable content sub-items with content sub-items specified in the selected content sub-item substitution opportunity.

There is also provided in accordance with further embodiments of the present invention a computer program including computer program code means adapted to perform all the steps of the above described method when the program is run on a computer.

There is also provided in accordance with further embodiments of the present invention a computer program as described above embodied on a computer readable medium.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

The following definitions will be useful in understanding the description of embodiments of the invention that follows:

Spot—A time interval used in a broadcast for one or more advertisements/commercials;

Avail—An opportunity for advertisement substitution comprising a time interval of consecutive spots;

Avail schedule—A schedule of avails;

Virtual channel—A channel to which recoded content can be associated, the association being controlled by association criteria such as originating broadcast channel, content genre, target audience, time of day, content title, parental rating, classification, etc.;

Profile attributes—Attributes that define a target audience for a given advertisement within a spot or avail. Examples include demographic, hasChildren, zip code, device type (standard/high definition), subscriber type, geographic region, preferred genre, gender, financial status, loyalty card holder, subscription tier, etc.;

Profile—within the context of an avail or a spot, the conditions to be met for an advertisement substitution to be valid. Put another way, a profile (usually in the form of a profile attribute or a set of profile attributes linked by logical expressions) expresses the criteria that are used to define a target group of subscribers and determine if an advertisement substitution should take place;

Content metadata—Information about content (e.g. DVB Service Information (DVB-SI), channel, time of day etc.)

Figure 1:
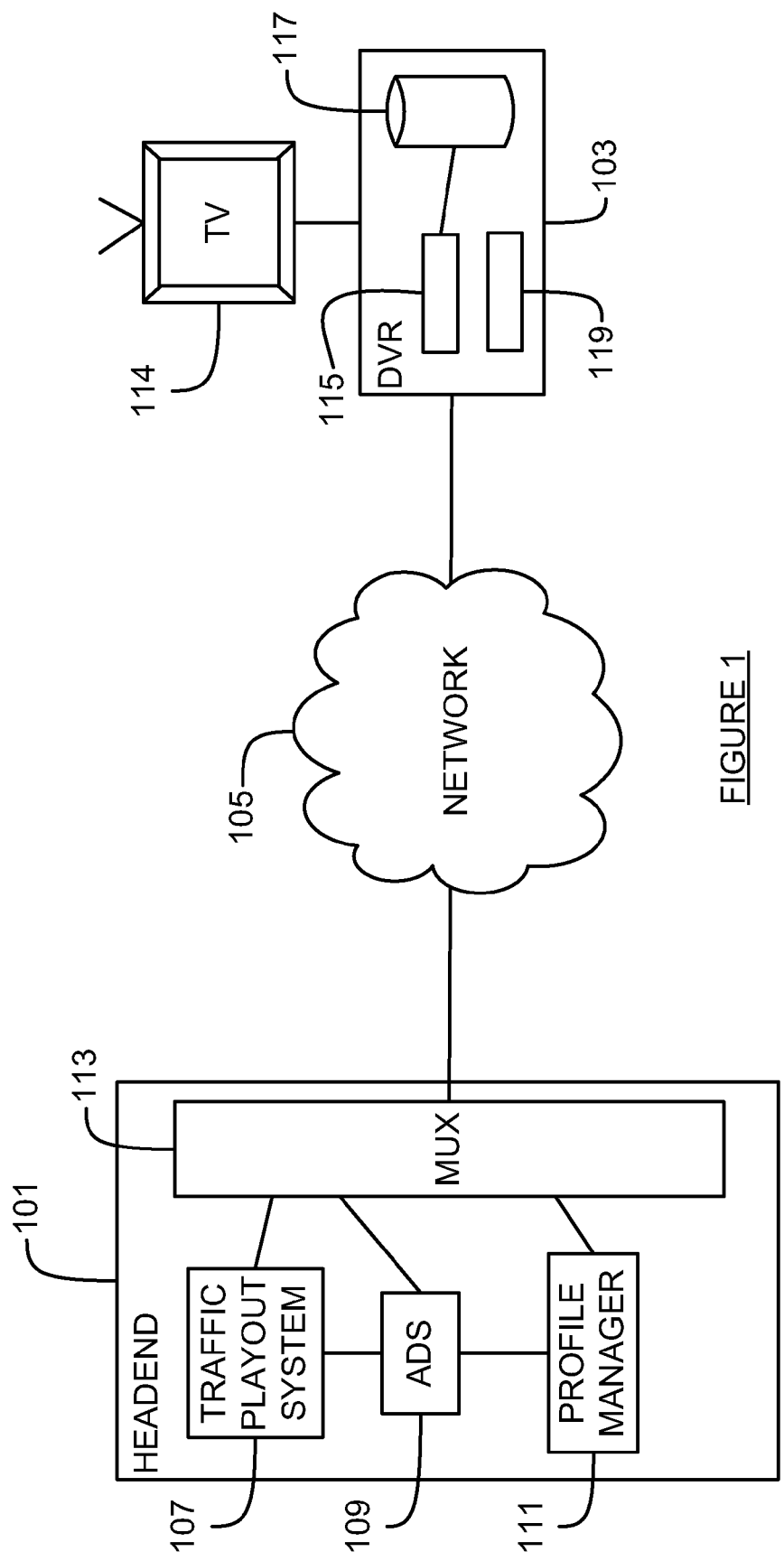
FIG. 1 is a simplified pictorial illustration of a content sub-item substitution system constructed and operative in accordance with embodiments of the present invention.

Reference is now made to FIG. 1, which shows a headend 101 that communicates with a digital video recorder DVR 103 via a one-way or two-way communication network 105 that includes at least one of the following: a satellite based communication network; a cable based communication network; a terrestrial broadcast television network; a telephony based communication network; a mobile telephony based communication network; an Internet Protocol (IP) television broadcast network; and a computer based communication network.

It is appreciated that in alternative embodiments, communication network 105 may, for example, be implemented by a one-way or two-way hybrid communication network, such as a combination cable-telephone network, a combination satellite-telephone network, a combination satellite-computer network, or by any other appropriate network.

Physical links in network 105 are implemented via optical links, conventional telephone links, radio frequency (RF) wired or wireless links, or any other suitable links. It is appreciated that headend 101 may communicate with a plurality of DVRs 103 via communication network 105. Additionally, or alternatively, a plurality of headends 101 may communicate with a single DVR 103 or with a plurality of DVRs 103 via communication network 105. For simplicity of depiction and description, and without limiting the generality of the present invention, only one DVR 103 and a single headend 101 are illustrated in FIG. 1 and referred to below as communicating via communication network 105.

Headend 101 includes the following elements: traffic playout system 107; advertisement decision system (ADS) 109; profile manager 111; and a multiplexer (MUX) 113. It is appreciated that headend 101 may include other elements not further described herein.

Traffic playout system 107 provides video and audio content (including programming that is separated by advertisements/commercials, and content metadata) in a format packaged for delivery via the MUX 113 to network 105.

ADS 109 performs assignment of profiles and advertisements to spots within avails, signalling of avails and profiles, and encoding of avails and profiles for delivery via the MUX 113 to network 105.

Profile manager 111 validates and stores user/device profiles for devices such as DVR 103. It also exposes an interface that enables the setting and modification of user/device profiles.

MUX 113 multiplexes video, audio and data provided by traffic playout system 107, ADS 109 and profile manager 111 and outputs multiplexed data for transmission to DVR 103 via network 105. It is appreciated that the transmissions may be transmitted either as out-of-band transmissions, such as data carousel transmissions, or as in-band transmissions, or any appropriate hybrid in-video and data carousel transmissions.

The multiplexed data are transmitted to DVR 103 via network 105 and received at an integrated receiver decoder (IRD) 115 in DVR 103. The IRD 115 is operable to receive, demultiplex, decode and decrypt/descramble as necessary the multiplexed data transmissions. DVR 103 also includes a high capacity storage device 117, such as a high capacity memory or disk, operatively associated with IRD 115.

DVR 103 records at least some of the transmissions received at the IRD 115 in the storage device 117 and displays recorded transmissions on television 114 at discretion of a user and at times selected by the user. It is appreciated that the recorded transmissions displayed by DVR 103 typically comprises transmissions delayed with respect to a time of broadcast of the transmissions by headend 101. Therefore, transmissions that undergo decoding, and if necessary decryption/descrambling at IRD 115, arrive either from broadcast transmissions broadcast by the headend 101, or from storage device 117 of DVR 103. The transmissions may, for example, be broadcast by headend 101 as regular scheduled transmissions or in the form of video-on-demand (VOD), near-video-on-demand (NVOD) or push-video-on-demand transmissions.

DVR 103 also stores virtual channel descriptions and avail schedules received at the IRD 115 in storage device 117. DVR 103 optionally also stores advertisements for use in advertisement substitution received at the IRD 115 in storage device 117.

DVR 103 also includes a processor 119, which typically includes an operating system that enables processing of the program transmissions.

It is appreciated that the elements of headend 101 and DVR 103 may be implemented in any appropriate combination of hardware and/or software. At least some of the elements comprising DVR 103 may be comprised in a single integrated circuit (IC).

The concept of a virtual channel in the context of embodiments of the present invention will now be described in more detail.

As mentioned previously, a virtual channel is used to group content that has been recorded by a user. It is a channel to which recoded content can be associated, the association being controlled by association criteria. The association criteria are typically defined and managed by a broadcaster. In the present embodiment, virtual channel definitions are transmitted from headend 101 to DVR 103 in the form of an extensible markup language (XML) file. An example XML file (channelDefinitions) defining four virtual channels is shown below:

```xml
<?xml version="1.0" ?>
    <channelDefinitions>
        <virtualChannel channelId="vChannel1" priority="90">
            <name>ITVChannels</name>
            <description>Used by all content that originated from one of the ITV channels</description>
            <associationCriteria>originatingChannel == ITV1 OR originatingChannel == ITV2 OR originatingChannel == ITV3</associationCriteria>
        </virtualChannel>
        <virtualChannel channelId="vChannel2" priority="100">
            <name>ITVSportsContent</name>
            <description>Used by all content that is of Genre Sports and from an ITV channel</description>
            <associationCriteria>contentGenre == Sport AND (originatingChannel == ITV1 OR originatingChannel == ITV2 OR originatingChannel == ITV3)</associationCriteria>
        </virtualChannel>
        <virtualChannel channelId="vChannel3" priority="95">
            <name>KidsContent</name>
            <description>Used by all content that has a parentalRating of U i.e. Children</description>
            <associationCriteria>contentRating == U</associationCriteria>
        </virtualChannel>
        <virtualChannel channelId="vChannel4" priority="80">
            <name>premium subscribers</name>
            <description>Used by all content that originated from one of the Operators Premium channels</description>
            <associationCriteria>originatingChannel == PremiumMovies OR originatingChannel == PremierFootball</associationCriteria>
        </virtualChannel>
        ...
    </channelDefinitions>
```

As can be seen in the XML code above, each virtual channel is defined by a channelId and comprises a name, a description of that virtual channel and some association criteria. The association criteria typically specify a particular target metadata attribute or set of attributes that the virtual channel is for.

In the example shown above, the virtual channel with channelId "vChannel1" is called "ITVChannels". The association criteria for vChannel1 are if the recorded content originated from one of the ITV channels ITV1, ITV2 or ITV3. The description of vChannel1 is therefore "used by all content that originated from one of the ITV channels".

The virtual channel with channelId "vChannel2" is called "ITVSportsContent". The association criteria for vChannel2 are if the recorded content originated from one of the ITV channels ITV1, ITV2 or ITV3 and if the genre of the recorded content is defined as "sport". The description of vChannel2 is therefore "used by all content that is of genre sports and from an ITV channel".

The virtual channel with channelId "vChannel3" is called "KidsContent". The association criterion for vChannel3 is if the recorded content has a content rating of U (universal). The description of vChannel3 is therefore "used by all content that has a parentalRating of U i.e. Children)".

The virtual channel with channelId "vChannel4" is called "Premium Subscribers". The association criteria for vChannel4 are if the recorded content originated from one of the operator's premium channels PremiumMovies or PremierFootball. The description of vChannel4 is therefore "used by all content that originated from one of the operator's premium channels".

Each virtual channel also has a priority assigned to it. In the example shown above, vChannel1 has a priority of 90, vChannel2 has a priority of 100, vChannel3 has a priority of 95 and vChannel4 has a priority of 80. The use of the virtual channel priority, which will be described in more detail below, is for those situations where an item of recorded content can be associated with more than one virtual channel.

The concepts of an avail schedule, avails and spots in the context of embodiments of the present invention will now be described in more detail. As mentioned previously, a spot is a time interval used in a broadcast for one or more advertisements/commercials; an avail is a time interval of consecutive spots and an avail schedule is a schedule of avails. Avail schedules are typically defined and managed by a broadcaster and typically correspond to a single virtual channel. Avail schedules are typically transmitted from headend 101 to DVR 103 at intervals (e.g. daily) and, in the present embodiment, in the form of an extensible markup language (XML) file. A first example XML file (availSchedule) showing at least a portion of an avail schedule is shown below:

```
<?xml version="1.0"?>
    <availSchedule channelId="vChannel1">
        <avail windowStart="2009-01-14T14:55:00"
            windowEnd="2009-01-14T15:05:00"
availId="458235802">
            <duration>120</duration>
            <spot spotId="12382" duration="60">
                <Ad duration="60">adId="3473"</Ad>
            </spot>
            <spot spotId="12383" duration="60">
                <Ad duration="60">adId="3534"</Ad>
            </spot>
        </avail>
        <avail windowStart="2009-01-14T15:25:00"
            windowEnd="2009-01-14T15:35:00"
availId="458235805">
            <duration>120</duration>
```

-continued

```
            <spot spotId="12392" duration="60">
                <Ad duration="60">adId="76456"</Ad>
            </spot>
            <spot spotId="12393" duration="60">
                <Ad duration="60">adId="2343"</Ad>
            </spot>
        </avail>
        ...
    </availSchedule>
```

As can be seen in the XML code above, the avail schedule is specified for a given virtual channel identified using the channelId as defined in the virtual channel definition. The avail schedule specifies one or more avails with each avail being defined by an availId. Each avail is typically only valid for a specified window of time defined either using a start time and an end time, or a start time and a window duration. In the above example, the validity windows are defined using a start time (windowStart) and an end time (windowEnd). A duration (typically in seconds) is also specified for each avail. Each avail specifies one or more spots with each spot being defined by a spotId. A duration (typically in seconds) is also specified for each spot. Each spot specifies one or more advertisements with each advertisement being identified by an adId. A duration (typically in seconds) is also specified for each advertisement.

In the above example, the avail schedule is specified for virtual channel "vChannel1" and comprises two avails having availIds 458235802 and 458235805. The avail with availId 458235802 has a duration of 120 s and is valid between 2.55 pm and 3.05 pm on 14 Jan. 2009. It comprises two spots (having spotIds of 12382 and 12383) of 60 s duration. The spot with spotId 12382 specifies an advertisement of 60s duration having an adId of 3473. The spot with spotId 12383 specifies an advertisement of 60s duration having an adId of 3534. The avail with availId 458235805 has a duration of 120s and is valid between 3.25 pm and 3.35 pm on 14 Jan. 2009. It comprises two spots (having spotIds of 12392 and 12393) of 60 s duration. The spot with spotId 12392 specifies an advertisement of 60 s duration having an adId of 76456. The spot with spotId 12393 specifies an advertisement of 60 s duration having an adId of 2343.

A second example XML file (availSchedule) showing at least a portion of an avail schedule is shown below:

```
<?xml version="1.0"?>
    <availSchedule channelId="vChannel1">
        <avail windowStart="2009-01-14T14:55:00"
            windowEnd="2009-01-14T15:05:00"
availId="458235802" order="1">
            <duration>120</duration>
            <spot spotId="12382" duration="60">
                <Ad duration="60">adId="3473"</Ad>
            </spot>
            <spot spotId="12383" duration="60">
                <Ad duration="60">adId="3534"</Ad>
            </spot>
        </avail>
        <avail windowStart="2009-01-14T15:00:00"
            windowEnd="2009-01-14T15:10:00"
availId="458235805" order="2">
            <duration>120</duration>
            <spot spotId="12392" duration="60">
                <Ad duration="60">adId="76456"</Ad>
```

-continued

```
        </spot>
        <spot spotId="12393" duration="60">
            <Ad duration="60">adId="2343"</Ad>
        </spot>
    </avail>
    ...
</availSchedule>
```

The second example XML file is almost identical to the first example XML file described previously except that the avail with availId 458235805 is valid between 3.00 pm and 3.10 pm; and an order variable has been specified for each avail. It will be realized that the validity windows of the two avails in this second example XML file overlap. (In other examples, the validity windows could even be identical.) The order variable is used in situations where more than one avail is valid. This will be described in more detail below. In the second example above, the avail with availId 458235802 has an order of 1 and the avail with availId 458235805 has an order of 2.

A third example XML file (availSchedule) showing at least a portion of an avail schedule is shown below:

```
<?xml version="1.0"?>
    <availSchedule channelId="vChannel1">
        <avail windowStart="2009-01-14T14:55:00"
               windowEnd="2009-01-14T15:05:00"
    availId="458235802">
            <profile>SportsLover</profile>
            <duration>120</duration>
            <spot spotId="12382" duration="60">
                <Ad duration="60">adId="3473"</Ad>
            </spot>
            <spot spotId="12383" duration="60">
                <Ad duration="60">adId="3534"</Ad>
            </spot>
        </avail>
        <avail windowStart="2009-01-14T14:55:00"
               windowEnd="2009-01-14T15:05:00"
    availId="458235805">
            <profile>NorthRegion AND male</profile>
            <duration>120</duration>
            <spot spotId="12392" duration="60">
                <Ad duration="60">adId="76456"</Ad>
            </spot>
            <spot spotId="12393" duration="60">
                <Ad duration="60">adId="2343"</Ad>
            </spot>
        </avail>
        <avail windowStart="2009-01-14T15:25:00"
               windowEnd="2009-01-14T15:35:00"
    availId="458235803">
            <profile>CarFan</profile>
            <duration>90</duration>
            <spot spotId="12372" duration="60">
                <Ad duration="60">adId="6457657"</Ad>
            </spot>
            <spot spotId="12373" duration="30">
                <Ad duration="30">adId="345435"</Ad>
            </spot>
        </avail>
        ...
    </availSchedule>
```

The first two avails in the avail schedule shown in the third example XML file are almost identical to the two avails in the first example XML file described previously except that the avail with availId 458235805 is also valid between 2.55 pm and 3.05 pm; and an avail level rule in the form of a profile has been specified for each avail. It will be remembered that a profile expresses the criterion/criteria that is/are used to define a target group of subscribers and determine if an advertisement substitution should take place and/or which avail to use for an advertisement substitution. The profile typically takes the form of a profile attribute; or a set of profile attributes linked by logical expressions. In the third example above the avail with availId 458235802 has a profile of "SportsLover" (so that the avail would only be used in an advertisement substitution for a subscriber who enjoyed watching sports programming) whilst the avail with availId 458235805 has a profile of "NorthRegion AND male" (so that the avail would only be used in an advertisement substitution for a male subscriber living in the north region.

The avail schedule shown in the third example XML file above also comprises a further avails. It should be noted that this third avail has a duration of 90 s (rather than 120 s) and that the avail comprises two spots, one of duration 60 s and one of duration 30 s (thus the duration of the avails within an avail schedule, and the duration of spots within an avail can vary).

A fourth example XML file (availSchedule) showing at least a portion of an avail schedule is shown below:

```
<?xml version="1.0"?>
    <availSchedule channelId="vChannel1">
        <avail windowStart="2009-01-14T14:55:00"
               windowEnd="2009-01-14T15:05:00"
    availId="458235802">
            <duration>120</duration>
            <spot spotId="12382" duration="60">
                <spotSubstitution>
                    <profile>SportsLover</profile>
                    <Ad duration="60">adId="3473"</Ad>
                </spotSubstitution>
                <spotSubstitution>
                    <profile>WildlifeLover</profile>
                    <Ad duration="30">adId="3463"</Ad>
                    <Ad duration="30">adId="3363"</Ad>
                </spotSubstitution>
            </spot>
            <spot spotId="12383" duration="60">
                <spotSubstitution>
                    <profile>SportsLover</profile>
                    <Ad duration="60">adId="3534"</Ad>
                </spotSubstitution>
                <spotSubstitution>
                    <profile>WildlifeLover</profile>
                    <Ad duration="60">adId="3539"</Ad>
                </spotSubstitution>
            </spot>
        </avail>
        ...
    </availSchedule>
```

The avail in the avail schedule shown in the fourth example XML file is similar to the first avail in the first example XML file described previously except that spot level rules in the form of a profile have been specified for each spot in the avail. It will be remembered that a profile expresses the criterion/criteria that is/are used to define a target group of subscribers and determine if an advertisement substitution should take place and/or which spot (i.e. which advertisement) to use for an advertisement substitution. The profile typically takes the form of a profile attribute; or a set of profile attributes linked by logical expressions. In the fourth example above, the spot with spotId 12382 specifies two spot substitution rules. One spot substitution rule has a profile of "SportsLover" so that advertisement with adId 3473 would be used in an advertisement substitution if the subscriber enjoyed watching sports programming. A further spot substitution rule has a profile of "WildlifeLover" so that if the subscriber instead enjoyed viewing wildlife programming, two advertisements with adId 3463 and 3363 would be used in an advertisement substitution. The avail in the avail schedule shown in the fourth example XML file above contains two spots, one with spotId 12382 and one with spotId 12383. The duration of each spot is 60 s resulting in an avail of duration 120 s. It is to be noted that the duration of the spot with spotId 12382 can be comprised of a single advertisement of duration 60 s or two advertisements each of duration 30 s and thus that a single spot can comprise more than one advertisement. It will be appreciated that a single spot can also be comprised of multiple advertisements of differing durations.

It is appreciated that various features of the above four XML files which are, for clarity, described in the contexts of separate examples may also be provided in combination in a single example. Conversely, various features of the XML files which are, for brevity, described in the context of a single example may also be provided separately or in any suitable subcombination.

Referring back to FIG. 1, MUX 113 multiplexes video and audio provided by traffic playout system 107; avail schedules and virtual channel definitions provided by ADS 109; and device profiles provided by profile manager 111 and outputs the multiplexed data for transmission to DVR 103 via network 105. The multiplexed data are received at IRD 115 in DVR 103. The IRD 115 receives, demultiplexes, decodes and decrypts/descrambles as necessary the multiplexed data transmissions. DVR 103 stores the received avail schedules, virtual channel definitions and device profile in storage device 117. At the discretion of a user of DVR 103, at least some of the video and audio transmissions received at the IRD 115 are also stored in the storage device 117 for delayed playback at times selected by the user.

Figure 2:
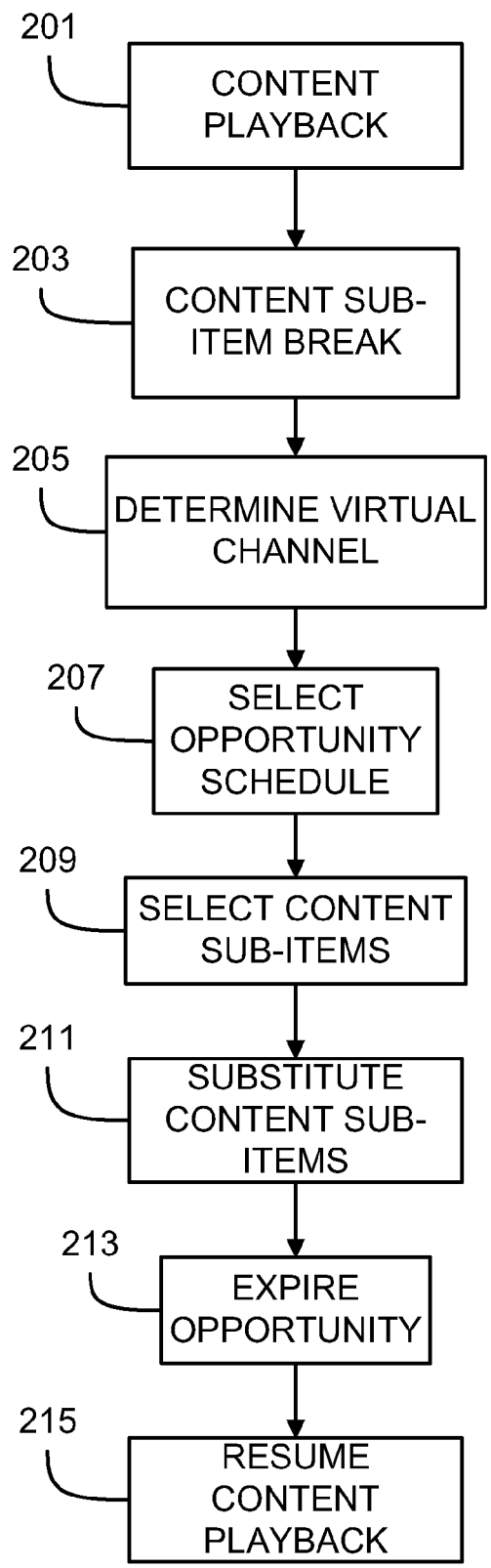
FIG. 2 is a flow chart of a content sub-item substitution method operative in accordance with embodiments of the present invention.
Figure 3:
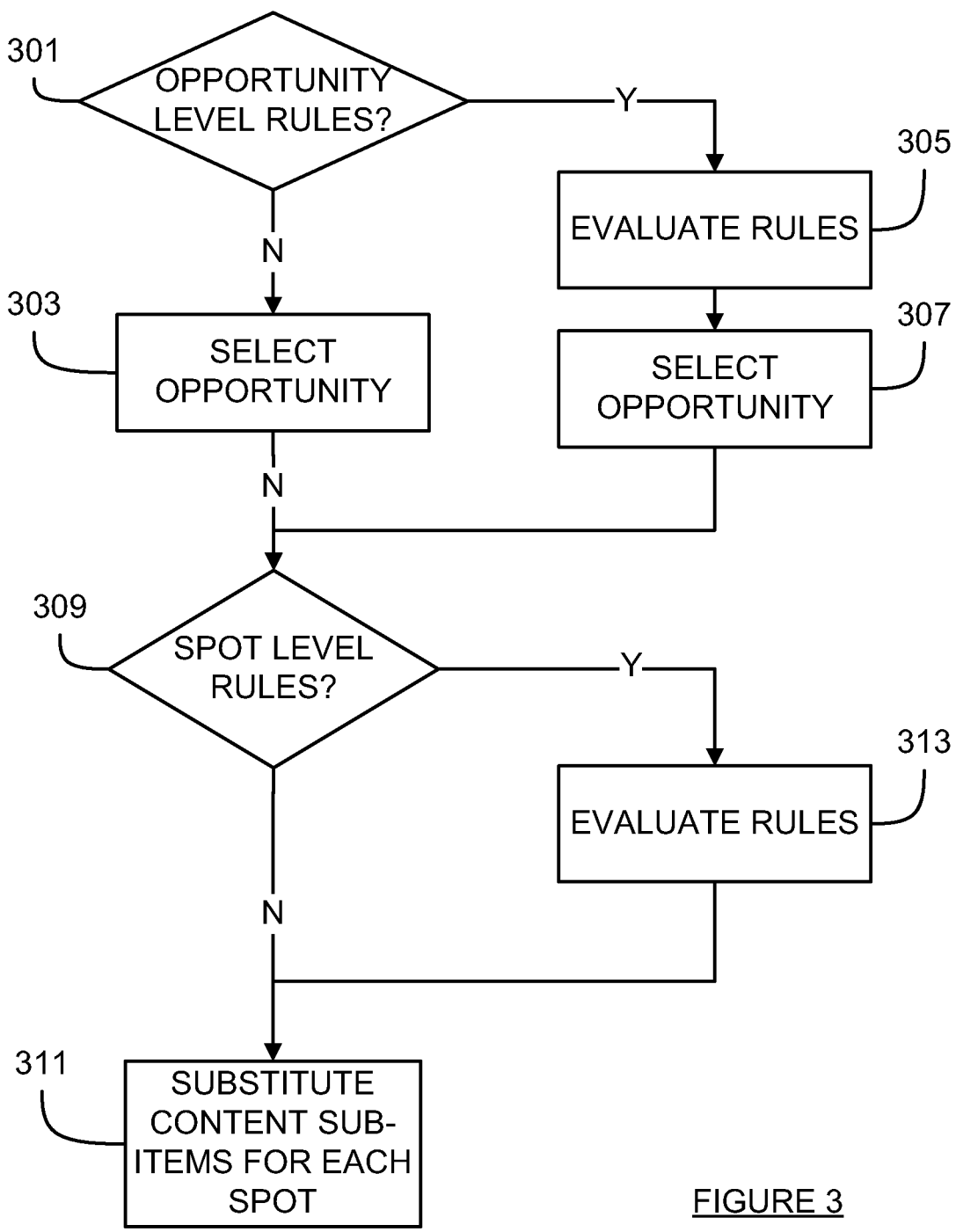
FIG. 3 is a flow chart of the content sub-item selection process of the content sub-item substitution method of FIG. 2 operative in accordance with embodiments of the present invention.

Referring now to FIGS. 2 and 3, audio video content received at IRD 115 can be stored in storage device 117 for delayed playback (step 201) at times selected by the user. It will be remembered that one or more advertisements are typically included with the stored video and audio content but those one or more advertisements, which may have been relevant at the time the audio video content was originally transmitted to DVR 103, may be 'stale' (i.e. not relevant) at the time the audio video content is actually played back. Thus it may be possible to substitute these 'stale', substitutable advertisements with more relevant advertisements.

Typically, once an avail is used for an advertisement substitution it is expired so that it is not used again for a further advertisement substitution. This can be achieved by removing the avail from storage device 117 after it has been used or when its validity window has expired. Alternatively, a status could be associated with each avail to signal that it has been used or is no longer relevant.

During content playback, processor 119 in DVR 103 is operable to detect an advertisement break in the content (step 203). Methods for detecting advertisement breaks will be known to someone skilled in the art and include those described in ANSI/SCTE 35. Upon detecting an advertisement break, processor 119 uses the content metadata associated with the content item in which the advertisement break is detected to determine a virtual channel for the content item (step 205). For example, and referring back to the virtual channel definitions described above, if an advertisement break is detected during playback of a content item that was originally broadcast on channel ITV1, processor 119 would determine that virtual channel vChannel1 is the appropriate virtual channel for the content item.

In some situations, when selecting a virtual channel to which the content item is bound, it is possible that the content item may be valid for more than one virtual channel. For example, if an advertisement break is detected during playback of a football match that was originally broadcast on channel ITV2, processor 119 would determine that either vChannel1 or vChannel2 could be an appropriate virtual channel for the content item since the content item is of genre sports and originated from an ITV channel. Processor 119 then uses the priorities assigned to each virtual channel in order to determine which virtual channel to use. Typically, the virtual channel that has the highest priority is selected and so in the above example, vChannel2 would be selected since it has a priority of 100 whereas vChannel1 has a priority of 90. In other embodiments, processor 119 may also determine whether or not there exists an avail that is currently valid for the virtual channel so that if more than one virtual channel is valid, processor 119 selects the virtual channel that has the highest priority and that has an avail that is currently valid.

Having determined a virtual channel for the content item, processor 119 then retrieves from storage device 117 an avail schedule for that virtual channel (step 207). If no avail schedule is available then the original advertisements are played out to the user. If an avail schedule is available then processor 119 continues to try to select advertisements (step 209) to substitute for the original advertisements (step 211) and this process will be described now in more detail with reference to FIG. 3.

Processor 119 first determines whether or not any avail level rules are defined for the avails in the selected avail schedule (step 301).

If there are not any avail level rules defined then processor 119 determines the current time and, for each unexpired avail in the avail schedule, determines if the current time falls within the avail's validity window.

If only one avail is found to be valid (and the referenced advertisement(s) is(are) available) then processor 119 selects that one valid avail (step 303).

If more than one avail is found to be valid then processor 119 either selects the first valid avail announced in the avail schedule (step 303) or, if the avails have been assigned an order variable as described above, processor 119 uses the order variable to select a valid avail earliest in the order (step 303). This results in an avail to be used for the advertisement substitution.

If no unexpired avails can be found in the avail schedule, or if no unexpired avail is valid at the current time, or if no advertisement(s) referenced in an avail is(are) available, the original advertisements are played out to the user.

If there are avail level rules defined, then for each avail in the avail schedule, processor 119 performs the following checks (step 305) until an avail evaluates to "true" and is selected (step 307):

a) evaluate the profile expressions defined for each avail using the DVR device profile previously stored in storage device 117;

b) check referenced advertisement(s) is(are) available; and c) check current time is within the avail validity period.

The evaluation results in an avail to be used for advertisement substitution. If none of the avail level rules evaluate to true, then advertisement substitution is not performed and the original advertisements are played out to the user.

Having selected an avail from the avail schedule, processor 119 then determines whether or not any spot level rules are defined for the spot(s) in the selected avail (step 309).

If there are not any spot level rules defined then processor 119 substitutes the original advertisements with the advertisement(s) specified in each spot in the selected avail (step 311). The advertisement(s) to be used in the substitution may be pre-stored in storage device 117 and/or may need to be fetched.

If there are spot level rules, then for each spot defined in the avail, processor 119 performs the following checks (step 313) until an entry evaluates to "true":

a) evaluate profile expression defined for each substitution spot using the DVR device profile previously stored in storage device 117; and b) check referenced advertisement(s) is(are) available For each spot, the evaluation results in one or more advertisements to be used to substitute an original advertisement (step 313). If none of the rules for a spot evaluate to true, advertisement substitution is not performed and the original advertisements are played out to the user.

Referring once again to FIG. 2, once advertisement substitution for the advertisement break has been completed, the avail that was used to perform the advertisement substitution is expired and/or deleted from storage device 117 (step 213) and playback of the content item continues (step 215) until a further advertisement break is detected at which time the above described process is repeated.

It is to be noted that the advertisement substitution described above can take place in either the transport (i.e. encoded) domain or in the presentation (i.e. unencoded) domain. In some embodiments, the term 'playback' therefore includes the process of decoding rather than simply passing the decoded output of IRD 115 to television 114.

It will be apparent from the foregoing description that many modifications or variations may be made to the above described embodiments without departing from the invention. Such modifications and variations include:

Although the above embodiments were described in relation to advertisement substitution, the process described is equally applicable to other forms of content sub-items or interstitial content. For example, if a weather forecast or a news summary was placed within a content item break, an up-to-date forecast or summary could be substituted and played out if that content item was recorded and played out at a later date when the original forecast or summary would be old.

In the above described embodiment, avails were described as having validity periods. In alternative embodiments, some or all of any avail level rules or spot level rules that are specified could also have validity periods associated with them.

In some of the above described embodiments, virtual channels were described having priorities in order to select a virtual channel if more than one was valid for a particular item of recorded content. In alternative embodiments, the content metadata could be prioritized so that some content metadata attributes are deemed to be more important than others. For example, a greater importance could be placed on the genre of a content item than on the originating channel of the content item when analyzing the metadata to determine a virtual channel.

In the above described embodiments, the virtual channel definitions and avail schedules were described as being transmitted from headend 101 to DVR 103 in the form of an extensible markup language (XML) file. In alternative embodiments, a specific binary encoding of the virtual channel definition and avail schedule data could be transmitted instead in order to reduce the bandwidth requirements and to increase the speed at which the data can be parsed.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

The invention claimed is:

1. A method of content sub-item substitution, said method comprising:

receiving virtual channel definitions from a headend, said virtual channel definitions defining each of a plurality of virtual channels on the basis of one or more metadata attributes associated with a given said virtual channel, wherein said virtual channels represent groupings for user recorded content according to said one or more metadata attributes;

receiving from said headend one or more content sub-item substitution opportunities for each of said virtual channels, each said content sub-item substitution opportunity specifying one or more content sub-items for use in said content sub-item substitution; and receiving and recording a content item, said content item including metadata associated with said content item and one or more substitutable content sub-items;

wherein said method further comprises, upon playback of a previously recorded content item:

matching said metadata associated with said previously recorded content item with said one or more metadata attributes, thereby determining a virtual channel valid for said previously recorded content item;

selecting a content sub-item substitution opportunity based on said determined virtual channel; and substituting said one or more substitutable content sub-items with said one or more content sub-items specified in said selected content sub-item substitution opportunity.

2. The method of claim 1, wherein said content sub-item substitution opportunity comprises a validity period according to which said content sub-item substitution opportunity is selected.

3. The method of claim 2, wherein said selecting a content sub-item substitution opportunity comprises determining a time for said content sub-item substitution and selecting a content sub-item substitution opportunity if said time falls within said validity period.

4. The method of claim 2, wherein said validity period is defined by a start time and a duration.

5. The method of claim 2, wherein said validity period is defined by a start time and an end time.

6. The method of claim 1, wherein content sub-item substitution opportunities are defined in an order, and a first content sub-item substitution opportunity not yet selected is selected when more than one content sub-item substitution opportunity can be selected.

7. The method of claim 1, wherein said one or more content sub-item substitution opportunities for each virtual channel comprise a content sub-item substitution schedule, and wherein a new content sub-item substitution schedule is received for each virtual channel at intervals.

8. The method of claim 1, wherein each virtual channel comprises a priority, and a virtual channel having a higher priority is used when more than one virtual channel is determined to be valid for said previously recorded content item.

9. The method of claim 1, wherein said metadata attributes comprise one or more from a group of: content genre, channel, target audience, region, time of day, parental rating, classification and content title.

10. The method of claim 1, said method further comprising: marking a content sub-item substitution opportunity as expired after it has been selected, wherein content sub-item substitution opportunities marked as expired cannot be selected.

11. The method of claim 1, wherein at least one of said one or more content sub-item substitution opportunities comprises a rule to be evaluated in order to select said content sub-item substitution opportunity.

12. The method of claim 11, wherein said rule comprises a profile attribute, and said selecting comprises selecting said content sub-item substitution opportunity if said profile attribute matches a stored user profile attribute.

13. The method of claim 1, wherein at least one of said one or more content sub-item substitution opportunities comprises one or more content sub-item spots, each of said one or more content sub-item spots specifying one or more content sub-items for use in said content sub-item substitution.

14. The method of claim 13, wherein at least one content sub-item spot specifies a plurality of content sub-items, and only one content sub-item of said plurality of content sub-items is used in said content sub-item substitution.

15. The method of claim 14, wherein each content sub-item in said plurality of content sub-items is associated with a rule to be evaluated for use in selecting which of said plurality of content sub-items to use in said content sub-item substitution.

16. The method of claim 15, wherein said rule comprises a profile attribute, and said selecting which of said plurality of content sub-items to use comprises selecting a content sub-item if said profile attribute matches a stored user profile attribute.

17. The method according to claim 1, wherein said content sub-item comprises an advertisement.

18. The method of claim 1, wherein said virtual channels are defined and managed by a broadcaster.

19. Apparatus for content sub-item substitution, said apparatus comprising:
   a receiver, operable to receive from a headend:
      virtual channel definitions, said virtual channel definitions defining each of a plurality of virtual channels on the basis of one or more metadata attributes associated with a given said virtual channel, wherein said virtual channels represent groupings for user recorded content according to said one or more metadata attributes;
      one or more content sub-item substitution opportunities for each of said virtual channels, each said content sub-item substitution opportunity specifying one or more content sub-items for use in said content sub-item substitution; and
      a content item, said content item including metadata associated with said content item and one or more substitutable content sub-items;
   a store, operable to store said virtual channel definitions, said one or more content sub-item substitution opportunities and said content item;
   a content sub-item processor operable, upon playback of a previously recorded content item, to:
      match said metadata associated with said previously recorded content item with said one or more metadata attributes, thereby determining a virtual channel valid for said previously recorded content item;
      select a content sub-item substitution opportunity based on said determined virtual channel; and
      substitute said one or more substitutable content sub-items with said one or more content sub-items specified in said selected content sub-item substitution opportunity.

20. Apparatus for content sub-item substitution, said apparatus comprising:
   means for receiving from a headend:
      virtual channel definitions, said virtual channel definitions defining each of a plurality of virtual channels on the basis of one or more metadata attributes associated with a given said virtual channel, wherein said virtual channels represent groupings for user recorded content according to said one or more metadata attributes;
      one or more content sub-item substitution opportunities for each of said virtual channels, each said content sub-item substitution opportunity specifying one or more content sub-items for use in said content sub-item substitution; and
      a content item, said content item including metadata associated with said content item and one or more substitutable content sub-items;
   means for storing said virtual channel definitions, said one or more content sub-item substitution opportunities and said content item;
   means for matching said metadata associated with said previously recorded content item with said one or more metadata attributes, thereby determining a virtual channel valid for said previously recorded content item;
   means for selecting a content sub-item substitution opportunity based on said determined virtual channel; and
   means for substituting said one or more substitutable content sub-items with said one or more content sub-items specified in said selected content sub-item substitution opportunity.

* * * * *